No. 680,313. Patented Aug. 13, 1901.
L. P. BURROWS.
PROCESS OF DESULFURIZING ORES.
(Application filed Dec. 8, 1900.)
(No Model.) 2 Sheets—Sheet 1.
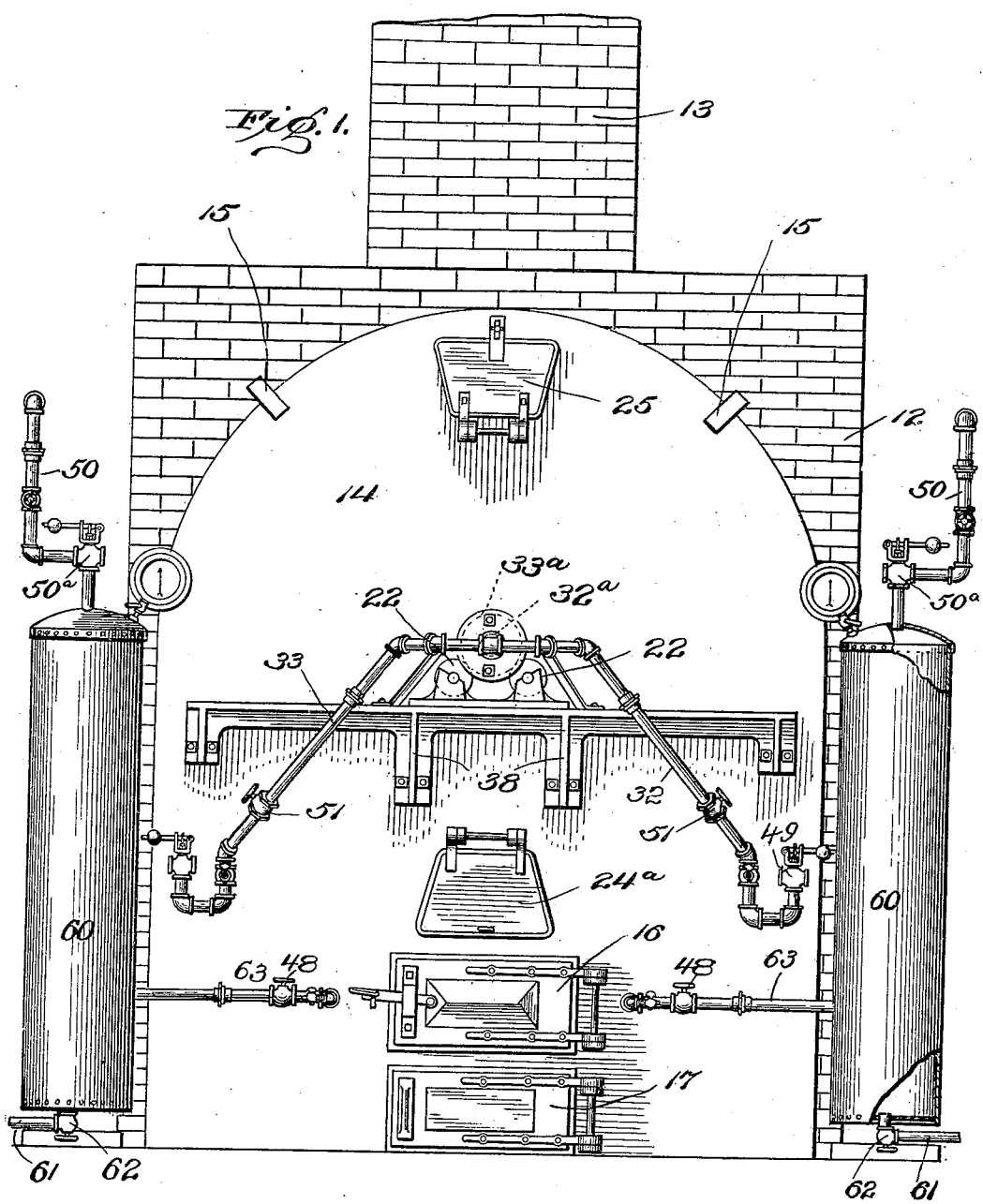

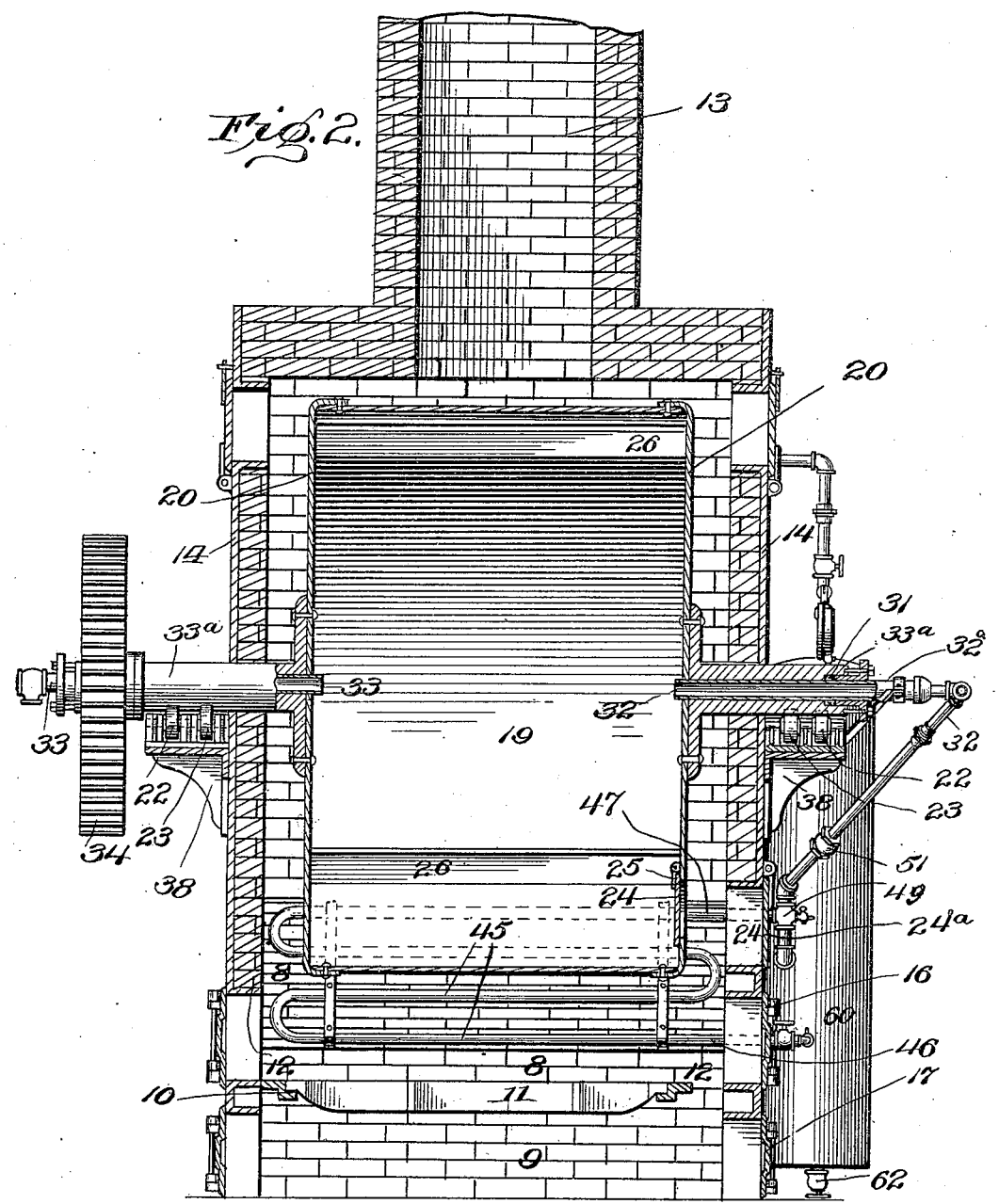

UNITED STATES PATENT OFFICE.

LINUS PORTER BURROWS, OF WASHINGTON, DISTRICT OF COLUMBIA.

PROCESS OF DESULFURIZING ORES.

SPECIFICATION forming part of Letters Patent No. 680,313, dated August 13, 1901.

Application filed December 8, 1900. Serial No. 39,135. (No specimens.)

*To all whom it may concern:*

Be it known that I, LINUS PORTER BURROWS, a citizen of the United States, residing at Washington, in the District of Columbia, have invented certain new and useful Improvements in Processes of Desulfurizing Ores; and I do hereby declare the following to be a full, clear, and exact description of the invention, such as will enable others skilled in the art to which it appertains to make and use the same.

Heretofore desulfurizing processes have nearly all been performed in the presence of oxygen of the atmosphere, and thereby the union of the bodies with oxygen followed. On account of the roasted product not being in such cases in a condition suitable for amalgamation, another step was found necessary— i. e., the metallic bodies were then subjected to the process of smelting in order to expel oxid of iron and other foreign substances.

The cost of treating low-grade ores by the process of roasting and smelting is made prohibitive.

I have discovered that the crystalline structure common with pyrite ores is broken up, the metallic elements being set free and the sulfur driven off when acted upon directly by a gaseous product evolved from water, as produced by me, and when used as it is being generated and upon the exclusion of atmospheric oxygen from the material upon which said gas is directed.

The object of the present invention is to render the metals in mineral substances accessible in a metallic state and involves the principle of subjecting heated sulfuret ores or other mineral substances to the action of the above-referred-to produced gaseous product under pressure, to the absolute exclusion of atmospheric oxygen, and the uses of the produced gases under the influence of the above-referred-to gas, thereby effecting under the most stimulating conditions, speedily and economically, the result of desulfurizing and freeing the metals from the impurities, ready for amalgamation; and my process consists in charging a closed receptacle with finely pulverized raw ore and subjecting the same to external heat and injecting the above-referred-to resultant gaseous product of water under pressure to expel the atmospheric air in said closed receptacle, which gas is produced by the following mode—viz., by taking high-pressure steam, permitting a jet of it to expand in a chamber (drawing off the water of condensation) and passing the lower-pressure steam drawn from said chamber through a superheating-section of pipe that is subjected to external heat and from thence allowing the resultant gaseous product to be fed as rapidly as formed into the closed retort.

To illustrate a suitable form of apparatus for carrying out or exemplifying my process, reference will be made to the accompanying drawings, in which—

Figure 1 represents a view of the front end of my furnace, while Fig. 2 is a side elevation thereof.

Like numerals indicate like parts in both figures.

In carrying out my invention the ores to be treated are broken up or crushed into particles of suitable size or may be pulverized. The ores are then placed in a closed retort or cylinder 19 of suitable form and construction to allow of their being agitated and heated by an external fire. Below the cylinder is the fire-box 8, which consists of proper masonry-work that extends downward to form the ash-pit 9 and provides a fireplace 10, that is provided with grate-bar 11, supported in the walls 12, and said masonry also extends upwardly to form an arched covering around said cylinder or retort and that terminates centrally in a chimney 13. At each end of the furnace are iron frameworks 14, that are held in position by fastening-plates 15, and said frames are each provided with door-openings 16 and 17 to afford a means for maintaining a fire and removing the ashes from either or both ends of the furnace. The cylinder above referred to is arranged to be horizontally disposed within said furnace and is preferably made of sheet metal, such as will stand an exceedingly high temperature without danger of fusion and which is provided with heads 20 of like material. The cylinder is mounted to revolve and is provided centrally with hollow trunnions $33^a$ at either end, which latter are mounted on carrying-rollers 22 and 23, that are in turn supported by brackets 38. Access to the interior of the cylinder for charging and discharging same with the ore to be treated is had through the manholes 24, that are provided with manhole-coverings 25 and which are adapted to be brought in register with the doors 24ª, that are formed in the frame 14. The interior of the cylinder is provided with longitudinally-extending ribs 26, of angle iron, that extend in proper-spaced parallelism lengthwise of the cylinder to form shelves that are inclined to project toward the axis of the cylinder and that serve during the revolution of the cylinder as agitators or mixers of the ore. Mounted on the hollow trunnions 33ª at one end of the cylinder is the gear-wheel 34, which is driven by a suitable source of power. (Not shown.)

In order to charge the cylinder with the required gaseous product as rapidly as it is generated, I provide the following gaseous-product-producing apparatus, which is shown in double equipment or duplicate systems that may be used separately. Water is converted into steam and may be generated in any desirable form of boiler or generating apparatus and allowed to pass from the dome of the boiler through the pipe 50 under high pressure through the pressure-regulating valve 50ª, where it enters the condensing-chamber 60. There being a much greater space for the entering steam to occupy, it will rapidly expand and the temperature thereof will be lessened, according to the expansion and the surrounding heat, and the water of condensation will be formed and may be drawn off from the bottom of the chamber or tank through the waste-pipe 61, that is controlled by the valve or draw-off cock 62. The steam thus expanded and dried of its damp condition is then led directly through the pipe 63, that is provided with a control-valve 48, to the zigzag course of pipe or superheating and converting section 45, which extends over the grate-bar on either side of the furnace and close enough to the brick wall against which it is supported to receive not only the direct heat of the fire, but to also receive the heat absorbed by the brick walls and radiated thereby.

Communication between the steam superheating and converting section and the interior of the cylinder is established through the pipe 32, that is provided with a draw-cock 51. In order to avert danger from excessive pressure, I also provide the pipe 32 with a pressure-regulator 49.

Having thus described my invention, what I claim is—

The process of desulfurizing ores, the same consisting of taking high-pressure steam, permitting a jet of it to expand in a chamber, drawing off the condensed water from this chamber, passing the lower-pressure steam drawn from the chamber through a pipe subjected to external heat; applying heat to a retort containing a body of sulfid ore and passing the resultant gaseous product from the aforesaid pipe through the mass of ore, in the manner substantially as specified.

In testimony whereof I affix my signature in presence of two witnesses.

LINUS PORTER BURROWS.

Witnesses:
O. H. BUDLONG,
JOSEPH W. BUELL.